United States Patent [19]

Forster

[11] Patent Number: 5,624,340
[45] Date of Patent: Apr. 29, 1997

[54] DRIVE UNIT WITH COAXIAL MOTOR, PLANETARY TRANSMISSION AND OUTPUT SHAFT

[75] Inventor: Franz Forster, Karlstadt-Mühlbach, Germany

[73] Assignee: Linde Aktiengesellschaft, Germany

[21] Appl. No.: 524,086

[22] Filed: Sep. 7, 1995

[30] Foreign Application Priority Data

Sep. 9, 1994 [DE] Germany ............... 44 32 134.1

[51] Int. Cl.⁶ .................. F16H 47/04; B60K 17/14; B60K 17/00
[52] U.S. Cl. .................................................. 475/72
[58] Field of Search ................... 475/72; 180/307, 180/308

[56] References Cited

U.S. PATENT DOCUMENTS 2,817,250 12/1957 Forster ............................ 475/72
2,907,230 10/1959 Kollmann ........................ 475/72
5,391,122 2/1995 Forster ............................ 475/72

Primary Examiner—Dirk Wright
Attorney, Agent, or Firm—Webb Ziesenheim Bruening Logsdon Orkin & Hanson, P.C.

[57] ABSTRACT

A drive unit having a housing, a motor and a planetary gear coaxial with the motor. The planetary gear is located within the housing downstream of the motor and is operatively connected to the motor. A final output drive shaft having a longitudinal passage is rotationally mounted in the housing coaxial with the motor and the planetary gear. The motor is non-rotationally mounted inside of the longitudinal passage in the final output drive shaft to decrease the radial dimension of the drive unit.

24 Claims, 4 Drawing Sheets

DRIVE UNIT WITH COAXIAL MOTOR, PLANETARY TRANSMISSION AND OUTPUT SHAFT

BACKGROUND OF THE INVENTION

1. Field of the Invention

This invention relates to a drive unit having a coaxially arranged motor, a planetary gear downstream of the motor in the direction of power flow, and an output shaft rotationally mounted in a housing.

2. Description of the Prior Art

Coaxial drive units are known in the art, for example, slewing gear drive systems for excavators. In these arrangements the motor, which is generally a hydraulic axial piston motor, the planetary gear and the final output drive shaft having a large diameter to accommodate the transverse forces it is required to absorb, are located axially one behind the other. This arrangement has a relatively long axial dimension.

SUMMARY OF THE INVENTION

An object of the invention is to provide a drive unit of the type described above which is compact and requires a relatively small number of individual parts.

The compact arrangement of the invention is achieved by locating the motor inside of the final output drive shaft which decreases the axial dimension normally required for the motor. Furthermore, since the final output drive shaft functions as the motor housing a separate motor housing is not required. The arrangement of the invention can be used for different types of motors, e.g., for electric motors or hydraulic motors, and can be used for numerous different applications.

In one embodiment of the invention, the final output drive shaft is provided with a gear to drive an excavator slewing gear.

In a second embodiment of the invention, the final output drive shaft is provided with a flange for mounting at least one wheel rim.

In a further embodiment of the invention, a brake is located between the motor and the planetary gear inside of the final output drive shaft or in a subassembly which is connected to the final output drive shaft. The brake can be small since the torque at the output of the motor is significantly less than at the output of the final output drive shaft.

In a refinement of the invention, the motor is an axial piston motor having a swash plate design wherein the cylinder drum is directly or indirectly supported against a control base locator which is non-rotationally connected to the final output drive shaft. The control base locator is connected to or integral with a web of the planetary gear and the web has at least two and preferably four web studs. Each web stud has a planet gear rotationally mounted on it and the planet gears engage a ring gear which is non-rotationally mounted within the housing. Pressure medium passages extend through the web studs and are connected to housing-side pressure medium connections formed in a housing cover fixed to the housing. When the motor is a hydrostatic axial piston motor having a swash plate design, the supply of pressure medium to the axial piston motor travels through the web studs.

A ring wheel is non-rotationally connected to the web and is located axially between the housing cover and the web studs. The ring wheel is provided on the end surface facing the web studs with individual recesses which receive individual web studs. The opposite surface of the ring wheel facing the housing cover is provided with two concentric annular grooves which are radially aligned with the housing-side pressure medium connections so that the pressure medium passages in the web studs are connected by the transverse holes in the ring wheel to the annular grooves. The ring wheel provides for the delivery and the discharge of pressure medium from the housing-side pressure medium connections in the housing cover to and from the pressure medium passages in the rotating web studs which emerge at the control base of the axial piston motor.

The ring wheel is axially movable and a spring force and the pressure medium operating pressure are exerted on it in the axial direction toward the housing-side surface in order to minimize leakage losses in the drive unit.

In another embodiment of the invention, the axial piston motor has an output shaft which is connected to a sun wheel of a first stage of a planetary gear. The planet gears of the planetary gear are engaged with a ring gear which is fastened to the web provided with the control base locator, which is provided as a web for the second stage of the planetary gear. The web of the first stage of the planetary gear is connected to a sun gear or is integral with the sun gear. The sun gear is engaged with the planet gears of the second stage which are mounted on the web connected to the control base locator. The planetary gear is a two-stage system.

In a further embodiment of the invention, the axial piston motor has an output drive shaft which is connected to or integral with a sun gear. The sun gear is engaged with first planet gears, which are mounted on the web studs of the web connected to the control base locator. The second planet gears are non-rotationally connected to the first planet gears and are mounted on the web studs which are engaged with a ring gear which is rotationally connected to the housing. In this embodiment, the planetary gear is a one and one-half stage system.

In an additional advantageous embodiment of the invention, the output drive shaft of the axial piston motor has one or more parts and extends beyond the swash plate. The output drive shaft is located radially within the final output drive shaft or a subassembly connected to it. A multiple disc brake is included which can be hydraulically released against the force of a spring.

In another embodiment of the invention, a brake piston is located in the final output drive shaft of the axial piston motor on which hydraulic pressure can be exerted and to which pressure medium is delivered via a longitudinal passage through the output shaft.

Conical roller bearings or angular contact ball bearings in a ring arrangement rotationally mount the final output drive shaft in the housing of the drive unit. Such a system of bearings absorbs the significant transverse forces exerted on a drive unit for a slewing gear, for example.

A complete understanding of the invention will be obtained from the following description when taken in connection with the accompanying drawing figures wherein like reference characters identify like parts throughout.

DESCRIPTION OF THE PREFERRED EMBODIMENTS

Figure 1:
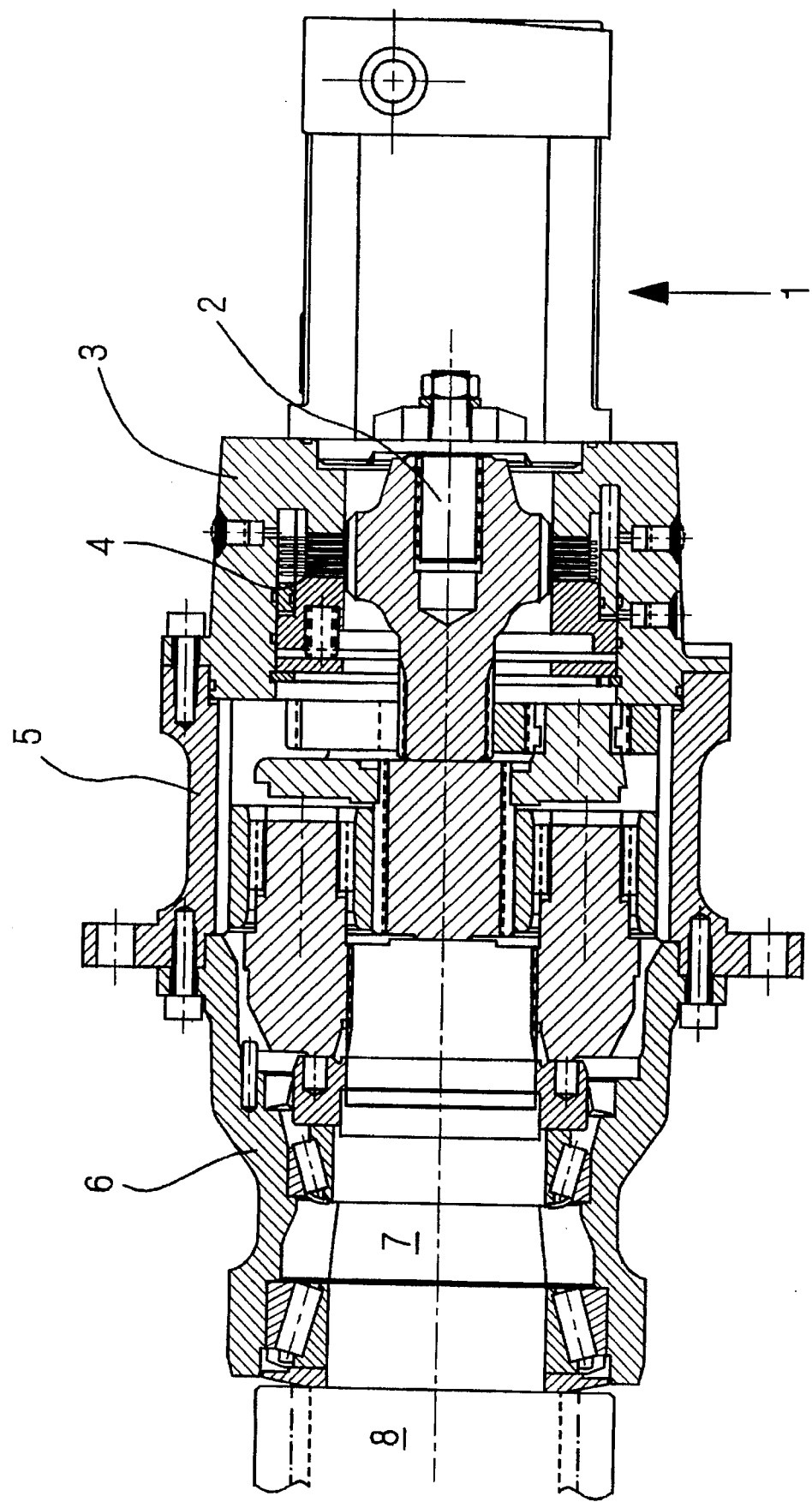
FIG. 1 is a longitudinal section of a prior art hydraulic drive unit for a slewing gear.

The prior art hydraulic slewing gear drive unit illustrated in FIG. 1 of the drawings has a hydrostatic motor 1 with an output shaft 2 located in a brake housing 3. The brake housing 3 is connected to a transmission housing 5 wherein a two-stage planetary gear is located. The transmission housing 5 is connected by bolts to a housing 6 in which a final output drive shaft 7 is rotationally mounted. A gear wheel 8, designed for engagement with a slewing gear of an excavator, is connected on the end of the final output drive shaft 7 which projects out of the housing 6. A brake 4 is coaxial with the output shaft 2 and is located within the brake housing 3.

In this prior art design, the motor, the brake, the transmission and the final output drive shaft are axially aligned, which results in a relatively long drive unit. Additionally, a large number of individual parts are required. For example, four separate housings are required, namely the housing for motor 1, the brake housing 3, the transmission housing 5 and the housing 6 of the final output drive shaft 7. All of these housings must be connected by flanges and bolts.

Figure 2:
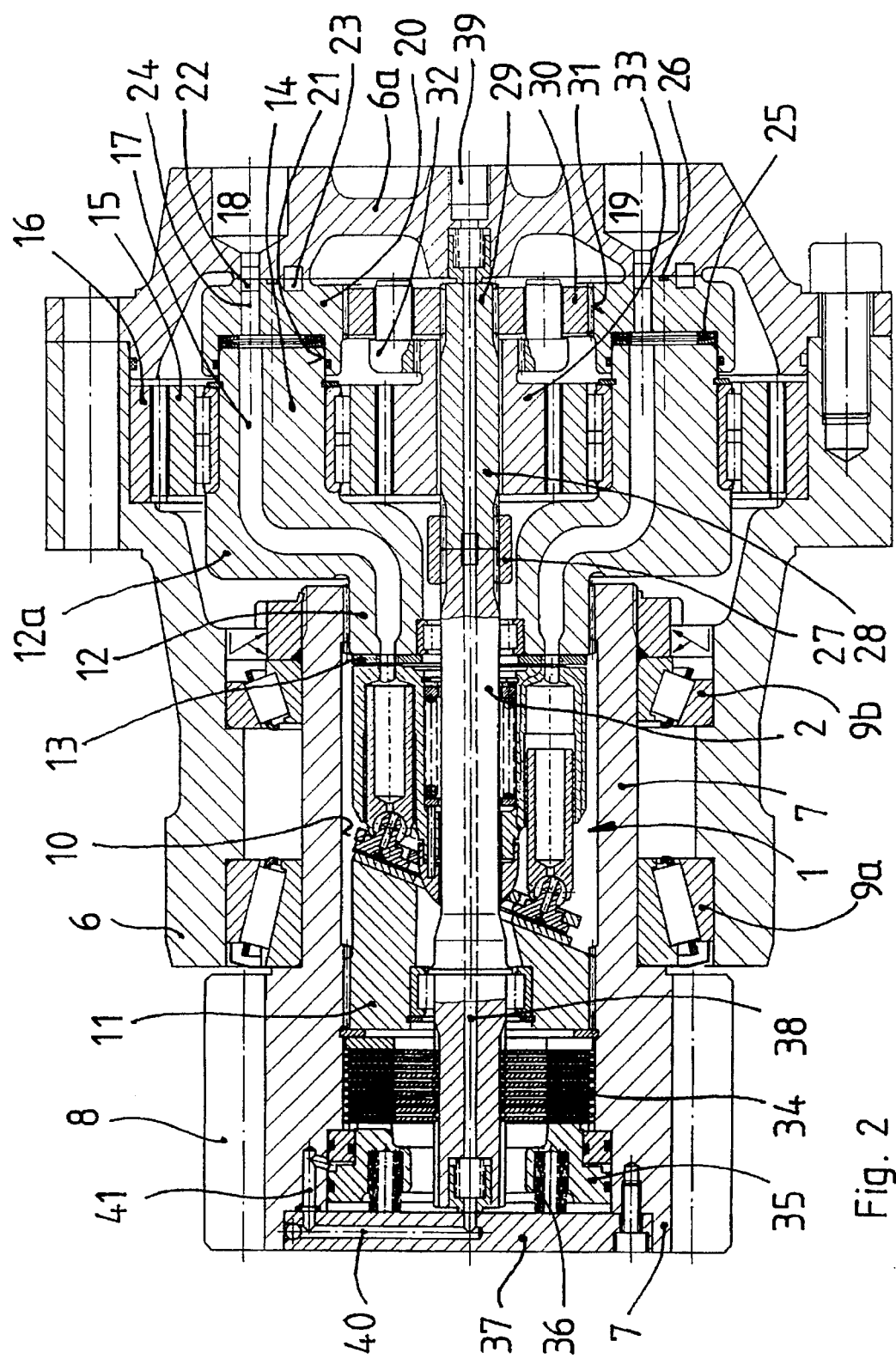
FIG. 2 is a longitudinal section of a hydraulic drive unit according to the invention.

In the drive unit shown in FIG. 2 of the drawings for a hydraulic slewing gear drive system, the hydrostatic axial piston swash plate motor 1 is located inside of the final output drive shaft 7. The final output drive shaft 7 is rotationally mounted by conical roller bearings 9a and 9b in cylindrical arrangements in the housing 6. The final output drive shaft 7 and the gear 8 cast on its free end are formed with a longitudinal recess 10 extending throughout the length of the shaft.

A swash plate 11 with a constant pivoting angle and a control base locator 12 is non-rotationally mounted inside of the longitudinal recess 10 in the final output drive shaft by gear teeth. A control base 13 having a control surface is non-rotationally mounted on control base locator 12.

A web 12a of the second stage of a two-stage planetary gear is cast on the control base locator 12. This web preferably has four web studs 14 and a planet gear 15 is rotationally mounted on each stud. Each planet gear 15 is engaged with a ring gear 16 which is non-rotationally mounted in the housing 6. Pressure medium passages 17 extend through the web studs 14 and open on one end at the control base 13 and on the other end at the outer end surface of web studs 14.

A stationary housing cover 6a is fastened to and located at the end of the housing 6. Two pressure medium connections 18 and 19 (the high-pressure and the low-pressure connections for the axial piston motor) are formed in the housing cover 6a. A ring wheel 20 having an inner end surface with spaced blind recesses 21 facing the web studs 14 for receiving the ends of web studs 14 is thereby non-rotationally connected to the web 12a of the second stage of the planetary gear.

The outer end surface of the ring wheel 20 is in contact with the inner end surface of the housing cover 6a and two concentric, axial, annular grooves 22 and 23 are formed on the outer end surface of ring wheel 20. The radially outer annular groove 22 is in communication with the pressure medium connection 18 and the radially inner annular groove 23 is in communication with the pressure medium connection 19. Transverse holes 24 in the ring wheel 20 connect the annular grooves 22 and 23 with the pressure medium passages 17 in the web studs 14. In this manner, pressure medium passes through the pressure medium connections 18 and 19 in the stationary housing cover 6a into the axial piston motor located inside of the final output drive shaft 7 and back out again in spite of the rotation of the web of the second stage of the planetary gear.

The ring wheel 20 is axially movable by the forces created by spring plates 25 and by the hydraulic pressure prevailing in the recesses toward the housing cover 6a which minimizes leakage losses. A hydrostatic relief groove 26 is located radially between the annular grooves 22 and 23 to prevent friction. This results in hydrostatic relief for ring wheel 20.

The output shaft 2 of the axial piston motor is mounted within the swash plate 11 and the control base locator 12. A shaft extension 28 is non-rotationally connected to the output shaft 2 at its swash plate end via a splined coupling sleeve 27. A sun gear 29 of the first stage of the planetary gear is formed on the end of shaft extension 28. The sun gear 29 is engaged with planet gears 30, which are also engaged with a ring gear 31 which is cast on the inner circumference of the ring wheel 20 which is non-rotationally mounted on the web of the second stage. The planet gears 30 of the first stage of the planetary gear are mounted on a web 32, which is integral with a sun gear 33 in the second stage of the planetary gear.

The output shaft 2 extends beyond the swash plates 11 and supports a multiple disc brake 34. The individual discs of the brake move longitudinally and are non-rotationally connected to both the output shaft 2 and to the final output drive shaft 7 or to the gear wheel 8 which is cast on the final output drive shaft 7. The disc brake 34 can be actuated by an axially movable ring-shaped brake piston 35 which can be hydraulically pressurized against the force of the springs 36 to release the brake 34. The springs 36 are mounted on an end cover 37 which closes the longitudinal recess 10 of the final output drive shaft 7. The hydraulic pressurization of the brake piston 35 is accomplished by fluid passing through a longitudinal passage 38 in the output shaft 2 which is connected to an inlet passage 39 in the stationary housing cover 6a and a radial outlet passage 40 in the cover 37 and a connecting passage 41 in the final output drive shaft 7.

Figure 3:
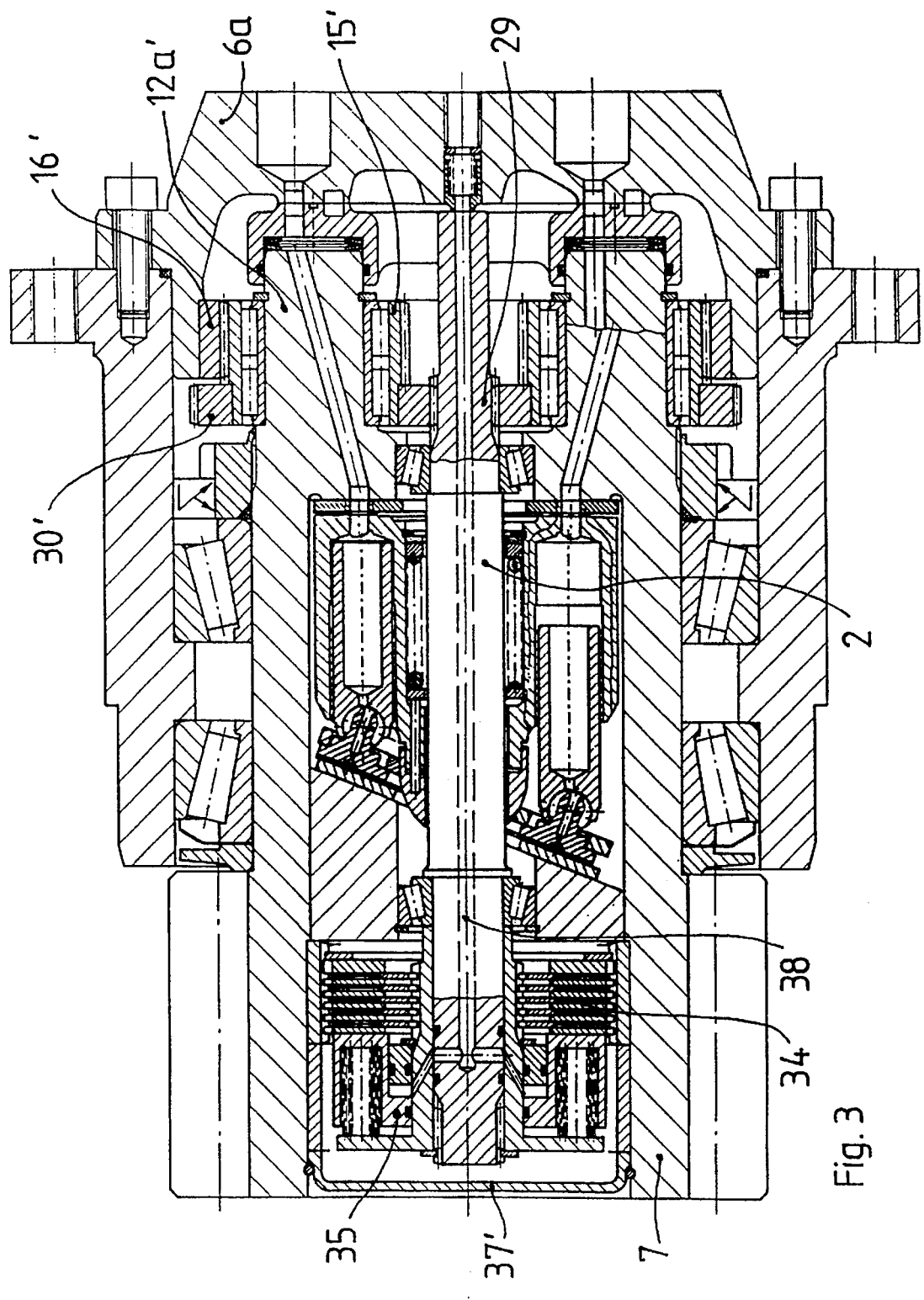
FIG. 3 is a longitudinal section of a second embodiment of a hydraulic drive unit according to the invention.

The embodiment shown in FIG. 3 of the drawings differs from the embodiment shown in FIG. 2 of the drawings in that the planetary gear is a one and one-half stage gear not a two-stage gear. In the FIG. 3 embodiment, the sun gear 29 is cast directly on the extended output shaft 2 and is engaged with first planet gears 30' which are non-rotationally connected to second planet gears 15' which are coaxial and rotationally mounted on the web 12a'. These second planet gears 15' are engaged with the ring gear 16' which, in this embodiment, is connected to the housing cover 6a. The diameter of the web 12a', in this embodiment, is smaller than the diameter of web 12a shown in FIG. 2, so that the radial dimension of the drive unit is smaller.

Additionally, in the embodiment shown in FIG. 3 of the drawings, the brake piston 35 is shaped and located so that the supply of pressure medium to release the brake 34, passes through the longitudinal passage 38 in the output shaft 2 and through a transverse passage connected thereto. No passages are necessary in the cover 37' or in the final output drive shaft 7 which results in a cover having a simple design.

Figure 4:
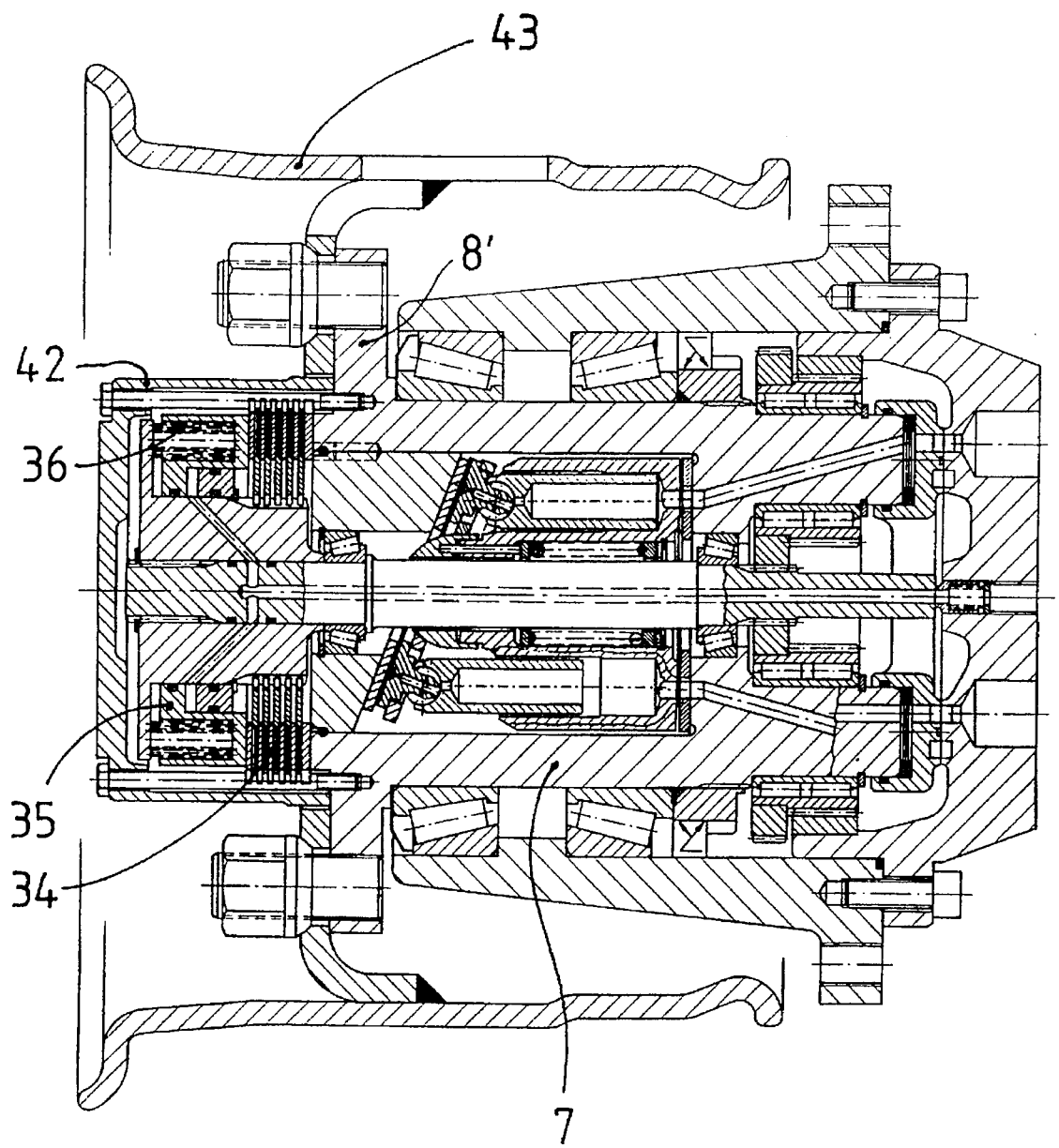
FIG. 4 is a longitudinal section of a third embodiment of a hydraulic drive unit according to the invention.

FIG. 4 of the drawings shows an embodiment of a drive unit according to the invention which is a hydraulic drive unit for a wheel. This drive unit differs from the drive unit shown in FIG. 3, for example, in that no gear 8 is cast on the end of the final output drive shaft 7. Instead, a cover 42 is fastened to the final output drive shaft to cover the brake 34, the brake piston 35 and the springs 36. In addition, a flange 8' is located on the final drive shaft 7 and a wheel rim 43 is fastened to the flange 8'.

While different embodiments of the invention have been described in detail herein, it will be understood by those skilled in the art that various modifications and alternatives to the embodiments can be developed in light of the overall teachings of the disclosure. Accordingly, the particular arrangements shown in the drawings are illustrative only and are not limiting as to the scope of the invention which is to be given the full breadth of the appended claims and any and all equivalents thereof.

I claim:

1. A drive unit including a stationary housing, a motor, a planetary gear coaxial with said motor located within said stationary housing downstream of said motor and operatively connected to said motor, a final output drive shaft having a longitudinal passage formed therein, means for rotationally mounting said final output drive shaft in said stationary housing coaxial with said motor and said planetary gear, and wherein said motor is non-rotationally mounted inside of said longitudinal passage in said final output drive shaft, whereby the radial dimension of said drive unit is minimized.

2. A drive unit as set forth in claim 1, including a gear on said final output drive shaft adapted to drive an excavator slewing gear.

3. A drive unit as set forth in claim 1, including an outwardly extending radial annular flange on said final output drive shaft and at least one annular wheel rim connected to said flange.

4. A drive unit as set forth in claim 1, including planetary gear assembly operatively connected to said final output drive shaft and a brake located inside of said final output drive shaft and operatively interposed between said motor and said planetary gear.

5. A drive unit as set forth in claim 2, including a planetary gear assembly operatively connected to said final output drive shaft and a brake located inside of said final output drive shaft and operatively interposed between said motor and said planetary gear.

6. A drive unit as set forth in claim 1, including a control base locator coaxial with and non-rotationally connected to said final output drive shaft and having a first end, and wherein said motor is a swash plate axial piston type having a cylindrical drum with an end located adjacent to said first end of said control base locator, said control base locator including a web forming a part of said planetary gear, said web having a plurality of axially extending web studs formed thereon, a planet gear rotationally mounted on each of said web studs, a ring gear non-rotationally connected within said housing and surrounding said planet gears, whereby said planet gears engage said ring gear, pressure medium passages formed in said web and said web studs and pressure medium connections formed in said housing having an end opening toward said web studs, wherein each of said ends of said pressure medium connections is in flow communication with one of said pressure medium passages.

7. A drive unit as set forth in claim 2, including a control base locator coaxial with and non-rotationally connected to said final output drive shaft and having a first end, and wherein said motor is a swash plate axial piston type having a cylindrical drum with an end located adjacent to said first end of said control base locator, said control base locator including a web forming a part of said planetary gear, said web having a plurality of axially extending web studs formed thereon, a planet gear rotationally mounted on each of said web studs, a ring gear non-rotationally connected within said housing and surrounding said planet gears, whereby said planet gears engage said ring gear, pressure medium passages formed in said web and said web studs and pressure medium connections formed in said housing having an end opening toward said web studs, wherein each of said ends of said pressure medium connections is in flow communication with one of said pressure medium passages.

8. A drive unit as set forth in claim 3, including a control base locator coaxial with and non-rotationally connected to said final output drive shaft and having a first end, and wherein said motor is a swash plate axial piston type having a cylindrical drum with an end located adjacent to said first end of said control base locator, said control base locator including a web forming a part of said planetary gear, said web having a plurality of axially extending web studs formed thereon, a planet gear rotationally mounted on each of said web studs, a ring gear non-rotationally connected within said housing and surrounding said planet gears, whereby said planet gears engage said ring gear, pressure medium passages formed in said web and said web studs and pressure medium connections formed in said housing having an end opening toward said web studs, wherein each of said ends of said pressure medium connections is in flow communication with one of said pressure medium passages.

9. A drive unit as set forth in claim 4, including a control base locator coaxial with and non-rotationally connected to said final output drive shaft and having a first end, and wherein said motor is a swash plate axial piston type having a cylindrical drum with an end located adjacent to said first end of said control base locator, said control base locator including a web forming a part of said planetary gear, said web having a plurality of axially extending web studs formed thereon, a planet gear rotationally mounted on each of said web studs, a ring gear non-rotationally connected within said housing and surrounding said planet gears, whereby said planet gears engage said ring gear, pressure medium passages formed in said web and said web studs and pressure medium connections formed in said housing having an end opening toward said web studs, wherein each of said ends of said pressure medium connections is in flow communication with one of said pressure medium passages.

10. A drive unit as set forth in claim 6, including a ring wheel non-rotationally connected to said web, said ring wheel located axially between said ends of said pressure medium connections in said housing and the ends of said web studs, said ring wheel having a plurality of recesses on the end surface facing the ends of said web studs aligned with said web studs wherein each of said recesses receives the end of a web stud to non-rotationally connect said web studs and said ring wheel, two concentric annular grooves formed on the end surface of said ring wheel opposite said end surface having a plurality of recesses and in contact with the surface of said housing on which said ends of said pressure medium connections open, and transverse holes formed in said ring wheel extending between said recesses formed in said web studs and said two concentric annular grooves formed on said ring wheel, whereby said pressure medium passages formed in said web studs are connected by said recesses and by said transverse holes in said ring wheel to said two concentric annular grooves.

11. A drive unit as set forth in claim 10, wherein said ring wheel is axially movable and including means for applying force to said ring wheel in the axial direction toward the surface of said housing on which said ends of said pressure medium connections open.

12. A drive unit as set forth in claim 11, wherein said means for applying force to said ring wheel is the combination of a spring and the operating pressure in the axial direction toward the surface of said housing on which said ends of said pressure medium connections open.

13. A drive unit as set forth in claim 6, wherein said axial piston motor has an output shaft, a first sun gear of a first stage of said planetary gear on said output shaft, a ring gear on said ring wheel connected to said control base locator, planet wheels of said planetary gear mounted on a web and engaged with said sun gear and said ring gear connected to said control base locator, whereby said ring gear functions as the web of the second stage of said planetary gear, whereby said web of the first stage of said planetary gear engages a second sun gear on said output shaft, whereby said second sun gear engages the planet gears of said second stage of said planetary gear mounted on said web which is connected to said control base locator.

14. A drive unit as set forth in claim 10, wherein said axial piston motor has an output shaft, a first sun gear of a first stage of said planetary gear on said output shaft, a ring gear on said ring wheel connected to said control base locator, planet wheels of said planetary gear mounted on a web and engaged with said sun gear and said ring gear connected to said control base locator, whereby said ring gear functions as the web of the second stage of said planetary gear, whereby said web of the first stage of said planetary gear engages a second sun gear on said output shaft, whereby said second sun gear engages the planet gears of said second stage of said planetary gear mounted on said web which is connected to said control base locator.

15. A drive unit as set forth in claim 11, wherein said axial piston motor has an output shaft, a first sun gear of a first stage of said planetary gear on said output shaft, a ring gear on said ring wheel connected to said control base locator, planet wheels of said planetary gear mounted on a web and engaged with said sun gear and said ring gear connected to said control base locator, whereby said ring gear functions as the web of the second stage of said planetary gear, whereby said web of the first stage of said planetary gear engages a second sun gear on said output shaft, whereby said second sun gear engages the planet gears of said second stage of said planetary gear mounted on said web which is connected to said control base locator.

16. A drive unit as set forth in claim 6, wherein said axial piston motor has an output shaft, a sun wheel on said output shaft, first planet gears mounted on said web studs of said web, said sun wheel engages with first planet gears mounted on web studs of said web, and second planet gears mounted on said web studs non-rotationally connected to said first planet gears and which engage with said ring gear non-rotationally connected to said housing.

17. A drive unit as set forth in claim 7, wherein said axial piston motor has an output shaft, a sun wheel on said output shaft, first planet gears mounted on said web studs of said web, said sun wheel engages with first planet gears mounted on web studs of said web, and second planet gears mounted on said web studs non-rotationally connected to said first planet gears and which engage said ring gear non-rotationally connected to said housing.

18. A drive unit as set forth in claim 6, wherein said output shaft extends beyond the swash plate of said axial piston motor, and a hydraulically actuated multiple disc brake means including a closing spring located between said output shaft and said final output drive shaft.

19. A drive unit as set forth in claim 10, wherein said output shaft extends beyond the swash plate of said axial piston motor, and a hydraulically actuated multiple disc brake means including a closing spring located between said output shaft and said final output drive shaft.

20. A drive unit as set forth in claim 8, wherein said output shaft extends beyond the swash plate of said axial piston motor, and a hydraulically actuated multiple disc brake means including a closing spring located between said output shaft and said final output drive shaft.

21. A drive unit as set forth in claim 13, wherein said output shaft extends beyond the swash plate of said axial piston motor, and a hydraulically actuated multiple disc brake means including a closing spring located between said output shaft and said final output drive shaft.

22. A drive unit as set forth in claim 16, wherein said output shaft extends beyond the swash plate of said axial piston motor, and a hydraulically actuated multiple disc brake means including a closing spring located between said output shaft and said final output drive shaft.

23. A drive unit as set forth in claim 9, including a hydraulically activated brake piston, a longitudinal passage formed in said output shaft of said axial piston motor, and means connecting said longitudinal passage to said brake piston for supplying a pressure medium to said brake piston.

24. A drive unit as set forth in claim 1, including one of conical roller bearings and ball bearings in a circular arrangement mounting said final output drive shaft in said housing of the drive unit.

* * * * *